United States Patent [19]
Szymczak et al.

[11] Patent Number: 5,433,679
[45] Date of Patent: Jul. 18, 1995

[54] EXERCISE TREADMILL AND METHOD

[75] Inventors: Eugene B. Szymczak, Glen Ellyn; Vincent C. Adams, Buffalo Grove; Teng-Ywe E. Hong, Naperville; Kenneth E. Lantz, Oak Park, all of Ill.

[73] Assignee: Life Fitness, Franklin Park, Ill.

[21] Appl. No.: 148,605

[22] Filed: Nov. 5, 1993

Related U.S. Application Data

[63] Continuation of Ser. No. 671,056, Mar. 18, 1991, abandoned.

[51] Int. Cl.⁶ .............................................. A63B 22/02
[52] U.S. Cl. ........................................ 482/54; 482/4; 198/500; 184/15.3; 184/18
[58] Field of Search ................... 482/1, 4–7, 482/51–54, 70, 71, 900; 198/500, 841; 472/90, 91; 184/15.1, 15.3, 16, 17, 18, 101, 102; 474/91

[56] References Cited

U.S. PATENT DOCUMENTS

| | | | |
|---|---|---|---|
| 3,491,543 | 1/1970 | Field | 184/15.1 X |
| 3,815,960 | 6/1974 | Russ, Sr. et al. | 184/15.1 X |
| 3,972,681 | 8/1976 | Clark et al. | 374/31 X |
| 4,149,624 | 4/1979 | Douty et al. | 198/500 X |
| 4,226,325 | 10/1980 | Vandas . | |
| 4,357,249 | 11/1982 | Mellor | 252/12 |
| 4,394,160 | 7/1983 | Freitag et al. | 75/349 X |
| 4,537,285 | 8/1985 | Brown et al. | 198/500 X |
| 4,602,779 | 7/1986 | Ogden | 482/54 |
| 4,704,857 | 11/1987 | Stahlecker | 54/264 |
| 4,872,664 | 10/1989 | Parker . | |
| 4,944,385 | 7/1990 | Shelby | 198/500 X |
| 5,100,127 | 3/1992 | Melnick et al. | 482/54 X |

FOREIGN PATENT DOCUMENTS 568402  3/1985  Australia .

OTHER PUBLICATIONS

European Patent Office Search Report.

Primary Examiner—Joe H. Cheng
Attorney, Agent, or Firm—Michael B. McMurry; Kathleen A. Ryan

[57] ABSTRACT

An exercise treadmill is disclosed which includes means for lubricating the endless belt treadmill components. In each embodiment, a lubricant is applied to either the inner surface of the treadmill belt or to the treadmill support deck, thereby reducing the treadmill belt to support deck friction. The applied lubricants can be either solid aerosol or liquid in form, and can be dispersed as a function of treadmill operating time, treadmill belt distance traversed or in response to a measured parameter indicative of belt to deck friction. Additionally, methods are disclosed for lubricating treadmills to reduce belt to deck friction.

35 Claims, 9 Drawing Sheets

EXERCISE TREADMILL AND METHOD

This application is a continuation of application Ser. No. 07/671,056, filed on Mar. 18, 1991, now abandoned.

FIELD OF THE INVENTION

The invention generally relates to exercise treadmills and in particular to treadmills which are periodically lubricated to reduce treadmill belt to support deck friction.

BACKGROUND OF THE INVENTION

Exercise treadmills are used for various recreational and therapeutic purposes. In these applications, an endless belt typically rotates around two substantially parallel pulleys located at either end of the treadmill. Examples of such treadmills are illustrated in U.S. Pat. Nos. 4,635,928, 4,659,074, 4,664,371, 4,334,676, 4,635,927, 4,643,418, 4,749,181, 4,614,337 and 3,711,812.

In most exercise treadmills, a support deck is located just below the endless belt exercise surface. When a user's foot impacts the exercise surface, the rotating belt presses against the support deck, temporarily causing the belt to rub against the deck. The friction generated between the belt and the deck compromises treadmill performance in several ways. For example, the belt to deck friction reduces belt life and can impede the otherwise smooth movement of the treadmill belt. Furthermore, the additional force required to overcome this friction puts additional stress on and requires additional drive power from the drive system of the treadmill. This in turn leads to an increased electrical power draw from the A.C. main supply. Much of the increased power draw manifests itself as additional heat generated within the treadmill. Additional problems can occur when several treadmills operating from the same A.C. circuit simultaneously require additional power, thereby increasing the current for that circuit beyond the current capacity of the circuit's circuit breaker or other protective device.

Treadmill builders have attempted to minimize the effects of belt to deck friction by waxing either the treadmill deck or the inner belt surface prior to final assembly of the treadmill. For example, some treadmill manufacturers are believed to manually rub a wax bar on the inner belt surface. Other manufacturers are believed to have attempted to embed solid wax particles in the belt itself. Still others are believed to have rubbed wax on the deck, hot waxed the deck, or to have applied some type of non-stick surface to the deck.

Whatever the method, the effects of wax applied during initial assembly of the treadmill apparatus diminishes as treadmill use time increases. While initial belt to deck coefficients of friction are about 0.2, this number increases as treadmill use increases. Eventually, after about 600 hours of use, the effects of increased belt to deck friction cause the belt to deck coefficient of friction to reach the 0.4 range. This in turn requires that the treadmill be serviced in some way to restore it to an operable condition having a serviceably acceptable coefficient of friction of about 0.2 to 0.3.

The servicing of treadmills is a particularly important concern in heavy use applications such as health clubs. In this application, a single treadmill may operate in a nearly continuous manner for eight to twelve hours a day or more. This nearly continuous operation causes a noticeable decrease in performance after 200–300 hours and, if ignored, can lead to treadmill failure after 600–1000 hours. Under these conditions, most club treadmills require service every 3–6 months for about ½ to 1 hour. This required servicing is costly and makes equipment unavailable to club patrons during servicing. On the other hand, if preventative treadmill servicing is not performed and the treadmill is allowed to fail, significant damage can occur to the motor, motor control circuits and other components. Repairing this type of failure can require major repair work and result in extensive treadmill service outages. Therefore, to maximize profitability and machine availability, a treadmill apparatus is desired which minimizes belt to deck friction so as to extend the time between rewaxing of or replacement of a belt or deck significantly beyond the average time between service of most treadmill devices.

SUMMARY OF THE INVENTION

It is therefore an object of the invention to provide an exercise treadmill which minimizes the need for periodic service caused by treadmill belt to support deck friction.

It is a further object of the invention to provide an exercise treadmill which minimizes friction between the treadmill belt and support deck by periodically lubricating the belt or deck components.

It is another object of the invention to monitor belt to deck friction and to lubricate the belt or deck components when the friction has increased to an undesirable level.

It is still another object of the invention to minimize the power required to operate an exercise treadmill as the initial effects of treadmill belt or deck lubrication diminish.

In particular, an exercise treadmill is provided in which a lubrication system is used to reduce or minimize treadmill belt to support deck friction. The lubrication system can apply a liquid, solid or aerosol lubricant to either the inner surface of the treadmill belt or the treadmill support deck. The lubrication system can apply lubricant as a function of hours of treadmill use or distance travelled by the treadmill belt. Alternatively, the lubrication system can apply lubricant when a measured parameter indicative of a preset level of belt to deck friction is exceeded. In each embodiment, the operation of an otherwise conventional endless belt treadmill is enhanced by the application of a lubricant to various treadmill structure.

In one embodiment, liquid lubricant is pumped from a lubricant reservoir and sprayed onto an inner belt surface by a pump. A nozzle can be included for directing the spray. A control circuit can be included to apply lubricant as a function of time, belt travel or a measured performance parameter.

In another embodiment, liquid lubricant is pumped from a lubricant reservoir and sprayed onto the support deck by a pump. One or more nozzles can be used to direct the lubricant spray onto the support deck. A control circuit permits the lubricant to be applied as a function of treadmill use or in response to a measure performance parameter.

In still another embodiment, an aerosol lubricant is sprayed onto an inner belt surface. An electro-mechanical activator is operated to discharge lubricant from an aerosol spray can mounted within the treadmill. A spray shield can be provided to direct the lubricant spray and to prevent overspray from reaching other treadmill components and outside of the machine. A control circuit permits lubricant to be discharged as a function of treadmill use or in response to a measured parameter such as treadmill drive motor current.

In yet another embodiment, a lubricant bar is mounted in proximity to an inner surface of the treadmill belt. A control circuit can engage the lubricant bar and the moving belt surface in response to a lubrication schedule or in response to a measured performance parameter.

In other embodiments, methods are provided for lubricating treadmills by determining when to lubricate the treadmill and applying a lubricant onto the treadmill belt or deck.

DETAILED DESCRIPTION OF THE INVENTION

The treadmills described herein employ one of several embodiments of a lubrication system to lengthen treadmill service intervals beyond that normally expected. In the FIGURES, in which like numbers refer to like parts, solid, liquid or aerosol lubricants are applied to the treadmill deck or belt to lower belt to deck friction.

Figure 1:
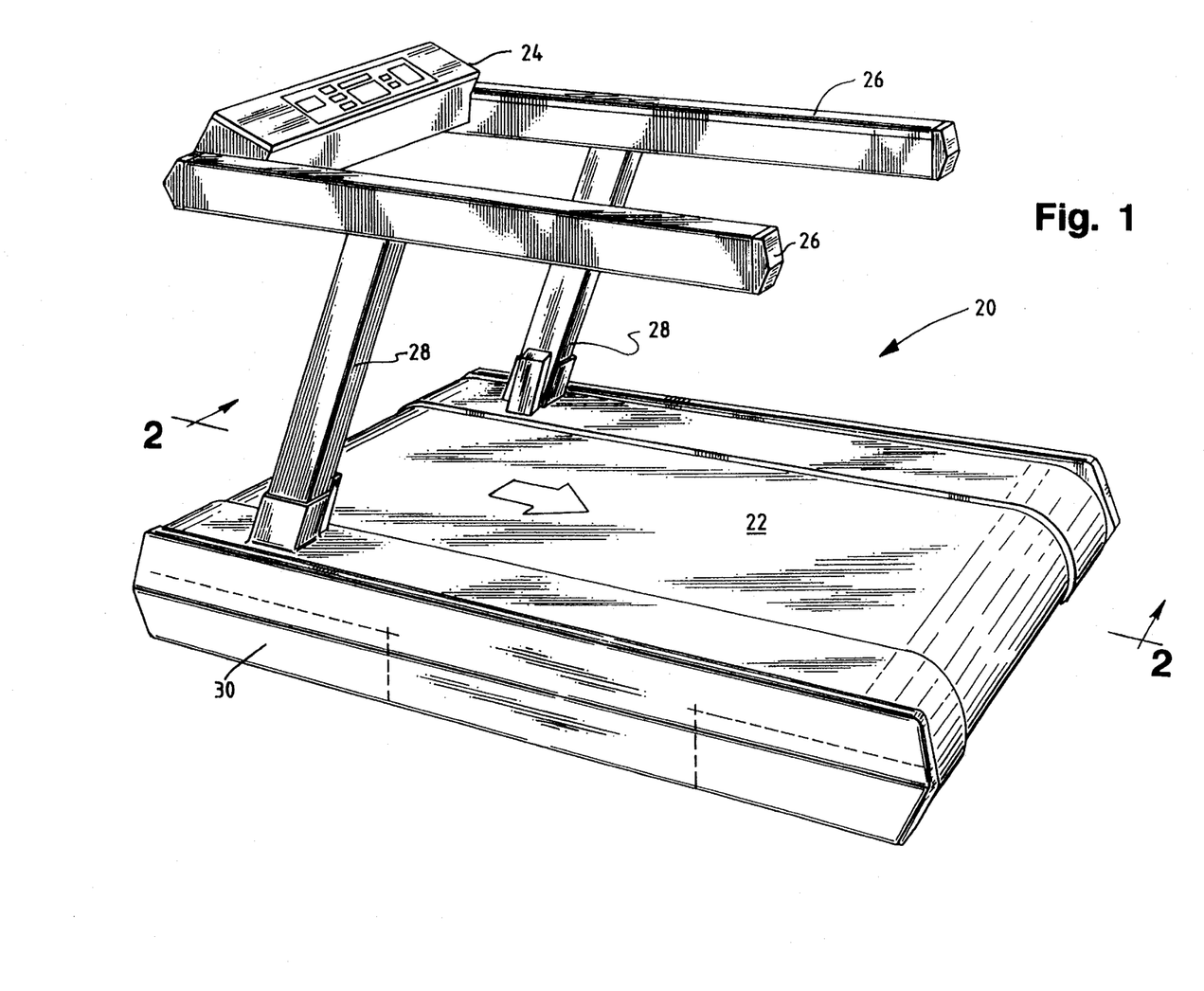
FIG. 1 is a perspective view of an exercise treadmill.

FIG. 1 is a perspective view of an exercise treadmill 20 of the endless belt type. The treadmill 20 includes an endless belt 22. The belt 22 rotates in the direction indicated by arrow R to provide a continually moving exercise surface for a walking or running individual.

Figure 2:
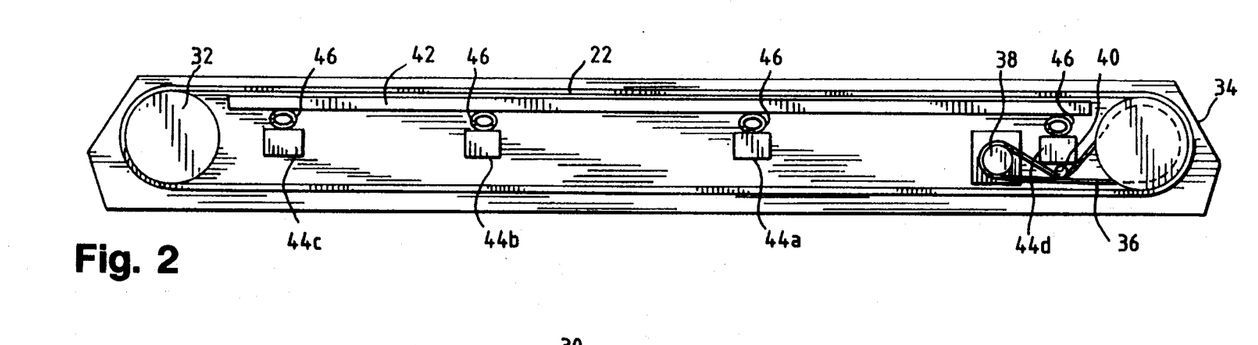
FIG. 2 is a simplified cross-sectional view of the exercise treadmill of FIG. 1 taken along line 2—2 of FIG. 1.

Other major treadmill components visible in FIG. 1 include a control panel 24 for controlling treadmill movement and providing user feedback, a pair of side rails 26 connected to a pair of railing posts 28 for providing a user gripping position, and a treadmill housing 30 for containing the endless belt 22 and associated components (see FIG. 2). Construction details for a treadmill like that shown in FIG. 1 can be found in U.S. patent application Ser. No. 07/452,885, filed Jun. 19, 1989, now abandoned, the disclosure of which is hereby incorporated by reference.

FIG. 2 depicts a simplified cross-section of the treadmill of FIG. 1 taken along line 2—2 of FIG. 1. The endless belt 22 is rotatably mounted on a front pulley 32 and a rear pulley 34. The rear pulley 34 is driven by a drive belt 36 which is driven by a drive pulley 38. The belt 36 is tensioned by an idler pulley 40 located between the drive pulley 38 and the rear pulley 34. The belt drive components shown in FIG. 2 are shown in example only as many suitable drive systems are known in the art for driving either the front pulley 32 or the rear pulley 34.

Also visible in FIG. 2 is the treadmill support deck 42. The deck 42 is resiliently mounted to a plurality of deck crossbars 44a-d by resilient support members 46. The resilient support members 46 can be bumpers constructed of any resilient material, or alternatively, can be springs or other types of flexible members capable of cushioning the impact caused by a treadmill user's feet on the deck 42. While the use of the resilient members 46 is not required, the members 46 provide the treadmill user with a much more satisfying treadmill feel.

As can be appreciated by viewing FIG. 2, the downward impact of a treadmill user's foot deflects the endless belt 22 against the support deck 42. The deflected belt 22 then rubs against the support deck 42. The continued rubbing of the belt 22 against the deck 42 tends to diminish the effectiveness of lubricants or other "nonstick" type coatings applied to the belt 22 or the deck 42. As the coefficient of friction between the belt 22 and the deck 42 increases, belt drive power and component wear gradually increase to the point where servicing is required to reduce the effects of the belt to deck friction. The need for such servicing is significantly reduced by the lubrication systems described in conjunction with FIGS. 3–11.

Figure 3:
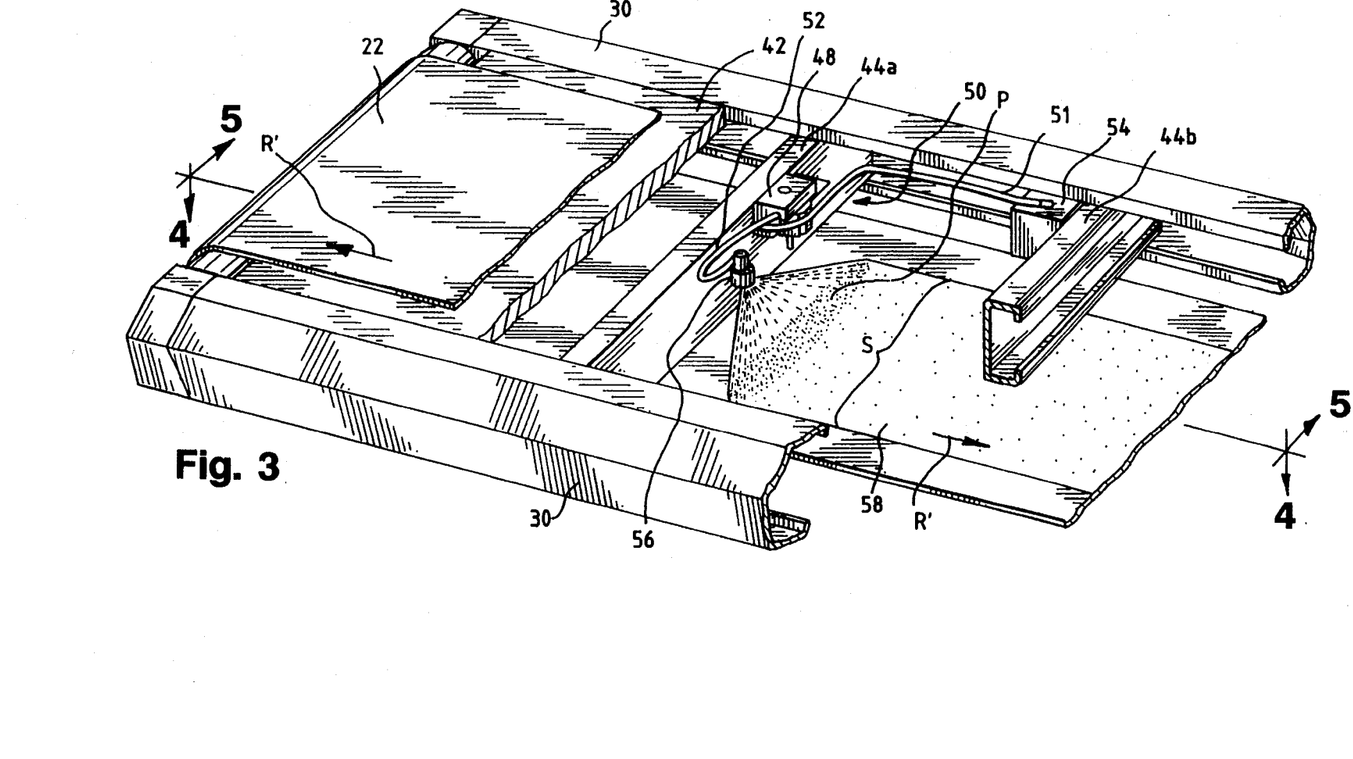
FIG. 3 is a partial perspective view of one embodiment of the lubricated treadmill invention showing a liquid lubrication system.

FIG. 3 provides a perspective view of a treadmill employing a liquid lubrication system in accordance with one embodiment of the invention. The direction of rotation of the endless belt 22 is shown by arrows R'. Attached to the crossbar 44a is a lubricant pump 48 connected to a lubricant supply line 50 having an inlet portion 51 and an outlet portion 52. On command, as discussed later in conjunction with FIGS. 12 and 13, a lubricant L is supplied through the supply line inlet portion 51 to the pump 48 from a lubricant reservoir 54. Reservoir 54 contains a bulk supply of the lubricant L. The pump 48 causes the lubricant L to be discharged from the supply line discharge portion 52 through a lubricant discharge nozzle 56 onto the lower inside surface 58 of the belt 22. The nozzle 56 generates a spray pattern covering the area P on the surface 58, and the rotation of the belt 22 results in the applied spray covering the belt in the strip-like shaded area S shown in FIG. 3.

Pump 48 is preferably an ANKO Model No. 908-108250 peristaltic pump available from the ANKO Co. of Bradenton, Fla. The use of a peristaltic-style pump is preferred for several reasons. First, this type of pump is not subject to lubricant clogging as would be gear or solenoid style pumps. Second, a peristaltic-type pump requires no seals and is self-priming. Additionally, the positive displacement action of a peristaltic-type pump provides positive control over lubricant flow rate, an important system parameter. Finally, the use of a peristaltic-type pump eliminates the need for check valves which might become clogged as a result of the intermittent operation of the lubrication system.

The supply line 50 preferably is a flexible neoprene tubing which can be adequately compressed by the peristaltic pump 48. The supply line 50 should be able to withstand operating pressures of about 20–30 pounds per square inch. At this pressure, the lubricant L is applied at a rate of about 0.2 gallons per minute when the lubricant pump is activated.

The lubricant reservoir 54 can have a two-quart capacity. At the lubrication intervals discussed later in conjunction with FIG. 15, this capacity results in about a one-year time between reservoir fillings.

A suitable nozzle for use as nozzle 56 can be assembled from off the shelf nozzle components available from Spraying Systems Co., of Wheaton, Ill. This nozzle (not illustrated) includes the Model 6471A-400 TD hose shank spray body, the Model TP 110-02 spray tip, and the Model CP 8027-NYB cap, which holds the spray tip to the spray body. The TP 110-02 spray tip provides a 110° wide spray pattern through 36/1000th inch diameter spray orifice.

The lubricant L preferably is a paraffin wax in an aqueous suspension. One suitable paraffin wax is the BW-547A Wax Emulsion available from Blended Waxes, Inc. of Oshkosh, Wis. In a typical application, the BW-547A wax is diluted to a 1% solution, and about 6 milliliters of this 1% wax to water solution is applied to the belt 22 during every 18 hours of treadmill use. Other lubricants useful in the invention include the Teflon based lubricants MS-143 and MS-122 available from Miller-Stephenson Chemical Co., Inc. of Morton Grove, Ill. It should also be noted that in some instances, the application of water alone can temporarily lower the belt to deck friction, but this effect is shorter-lived and less effective than the use of other lubricants.

Figure 4:
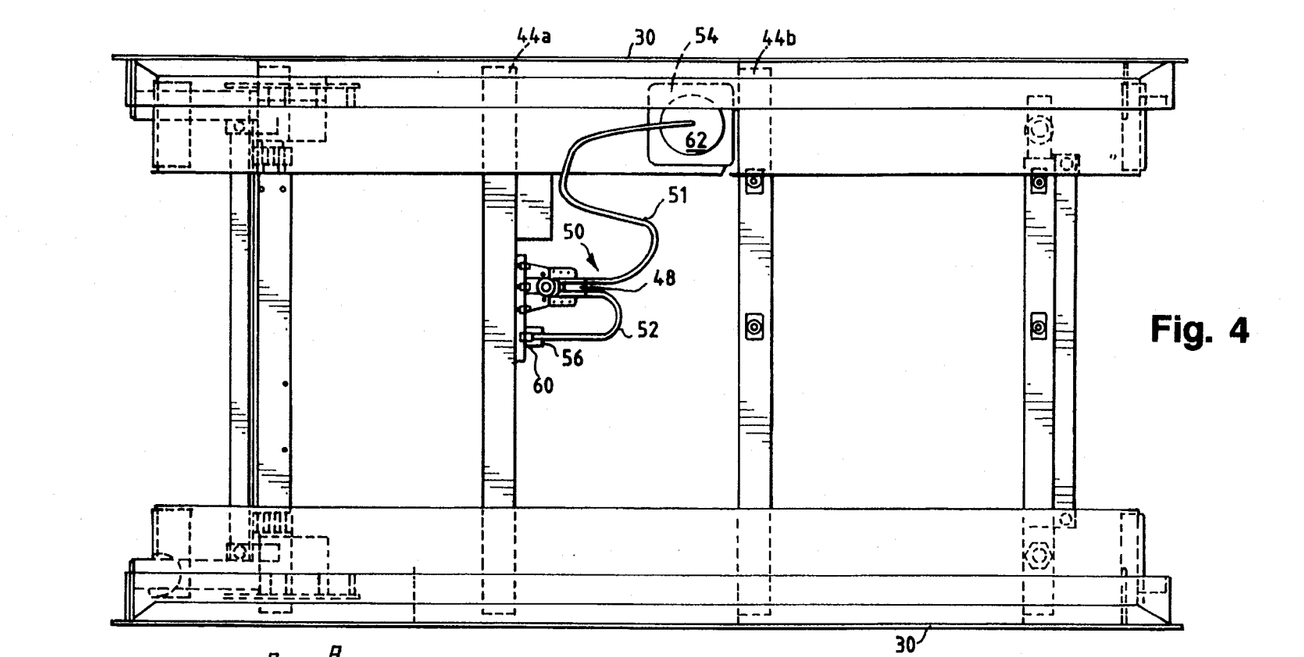
FIG. 4 is a partial top plan view of the treadmill of FIG. 3 taken along line 4—4 of FIG. 3 showing the primary components of the lubrication system.
Figure 5:
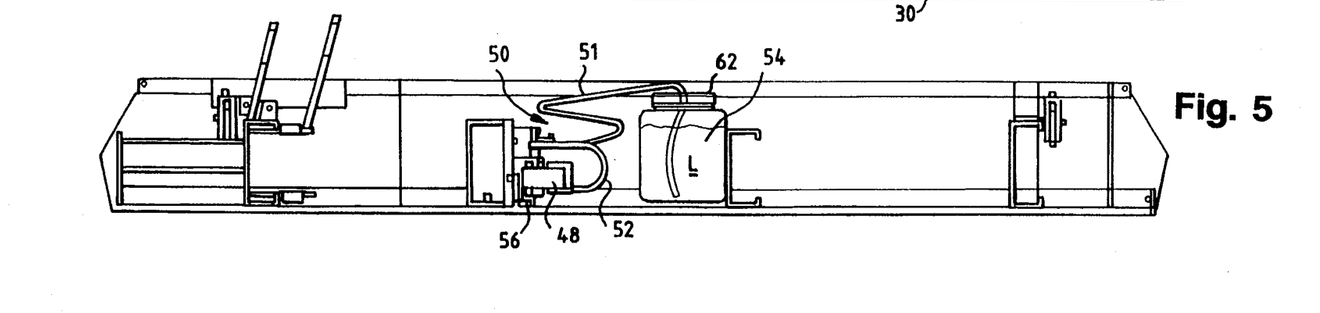
FIG. 5 is a partial cross-sectional view of the exercise treadmill of FIG. 3 taken along line 5—5 of FIG. 3 showing the primary components of the lubrication system.

FIGS. 4 and 5 provide additional mechanical details concerning the location and mounting of the lubrication-related treadmill components. Referring first to FIG. 4, the reservoir 54 is mounted between the crossbars 44a and 44b and within the housing 30, immediately adjacent an intersection of the crossbar 44b and the housing 30. The reservoir 54 can be attached to the housing 30 or the crossbar 44 in any convenient manner. Both the nozzle 56 and the lubricant pump 48 are attached to a bracket 60 which is then mounted to the crossbar 44a. The supply line inlet portion 51 runs from inside the reservoir 54, through the pump 48, through supply line discharge portion 52 and to the lubricant discharge nozzle 56. The nozzle 56 preferably is located at or near the center of the crossbar 44a and directed downward to provide a symmetric spray pattern on the belt 22 as shown in FIG. 3. As best seen in FIG. 5, the reservoir 54 includes a removable lid 62 to allow the refilling of the reservoir 54. Alternatively, a reservoir filling aperture with or without a filling line (not shown) could be provided to allow refilling of the reservoir without requiring access to the inside of the housing 30.

Figures 6, 7:
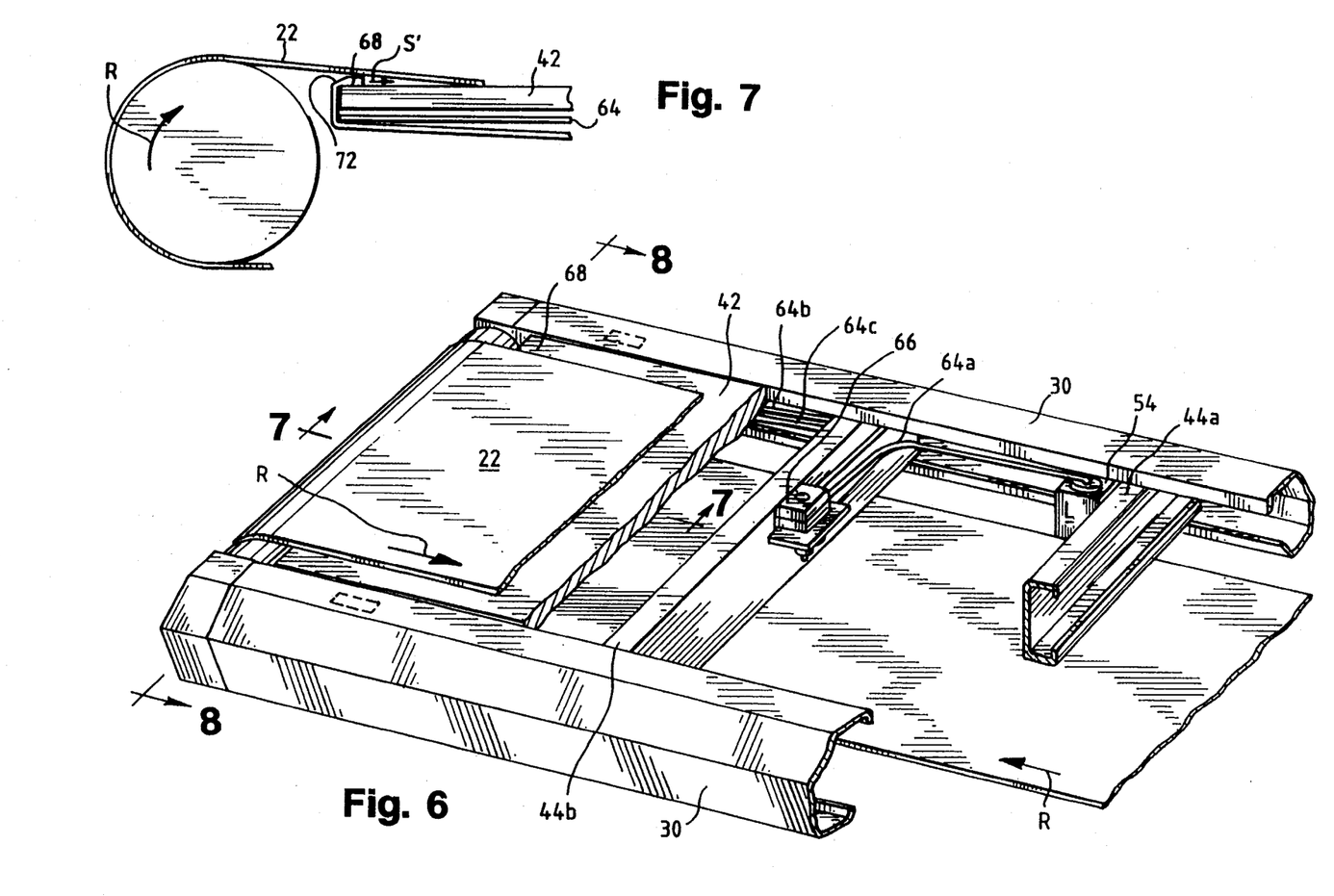
FIG. 6 is a partial perspective view of another embodiment of the lubricated treadmill invention using a liquid lubricant.
FIG. 7 is a partial cross-sectional view of the treadmill of FIG. 6 taken along line 7—7 of FIG. 6.

FIG. 6 depicts an alternative embodiment of the lubricated treadmill just described. In this embodiment, lubricant is sprayed between the belt 22 and the support deck 42 as shown by arrow S' in FIG. 7. Referring first to FIG. 6, the lubricant reservoir 54 is located adjacent the deck crossbar 44a and the treadmill housing 30. To provide lubricant dispersal between the belt 22 and the deck 42, a split lubricant supply line 64 provides lubricant flow through a dual peristaltic pump 66 and to an applicator bar 68. The split supply line 64 includes an inlet portion 64a and dual discharge portions 64b and 64c. The applicator bar 68 houses two separate nozzles 70a and 70b for spraying lubricant between the belt 22 and the deck 42 as shown in FIG. 7. The use of the split supply line 64, the dual pump 66 and the dual nozzles 70a and 70b is preferred because it eliminates the need for portioning a single pump output between the two nozzles 70a and 70b. The downwardly inclined forward edge 72 of applicator bar 68 is also preferred as it minimizes wear to the belt 22 caused by the impact of the belt in the bar 68. Overall flows and system pressures are similar to those already described in conjunction with the embodiment of FIGS. 3–5.

Figures 8, 9:
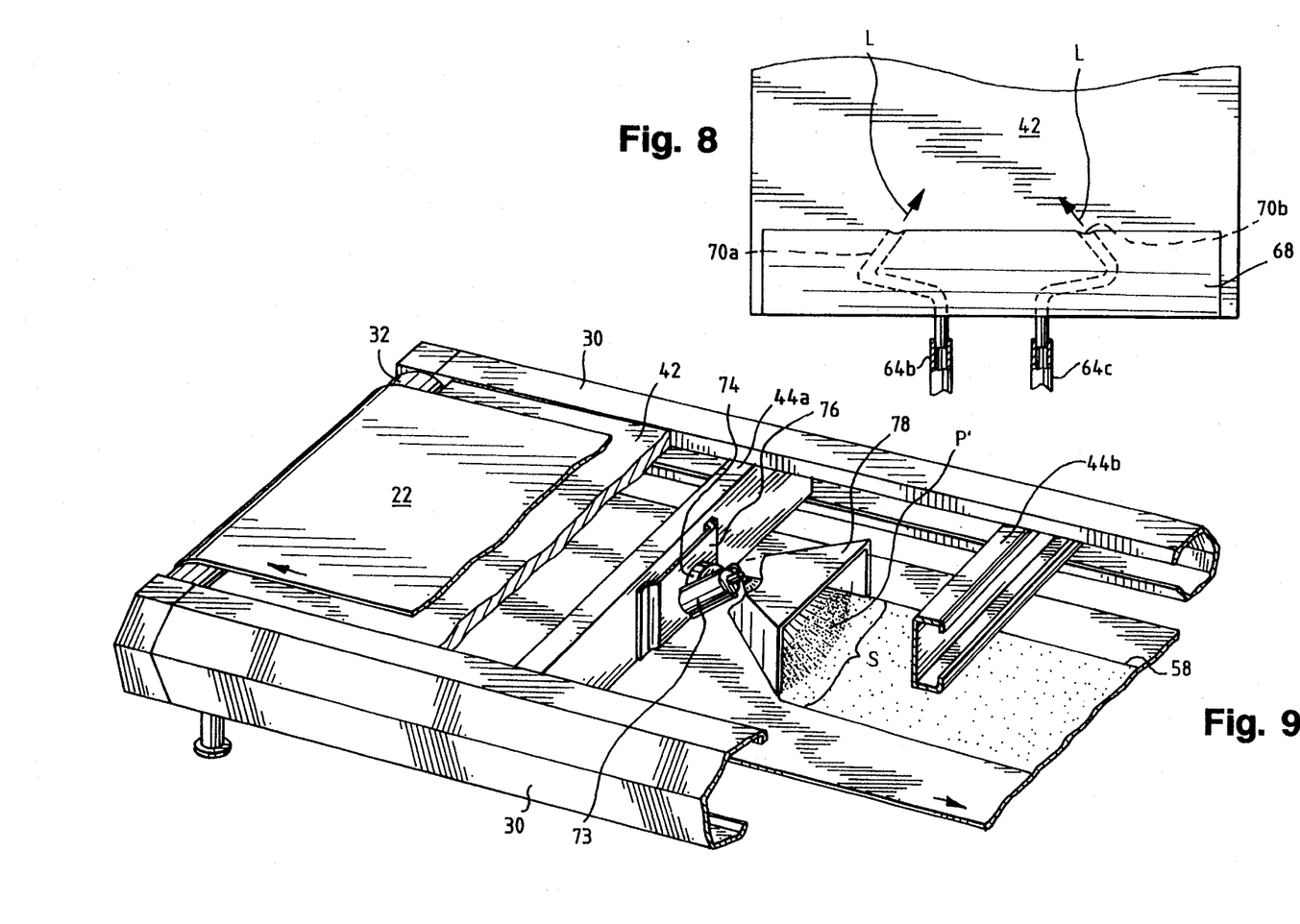
FIG. 8 is a top plan view of the applicator bar of FIG. 6 taken along line 8—8 of FIG. 6.
FIG. 9 is a partial perspective view of another embodiment of the lubricated treadmill invention using an aerosol spray lubricant.

FIG. 8 provides additional detail concerning the applicator bar 68. The nozzles 70a and 70b are symmetrically spaced apart and contained within the bar 68. The nozzles 70a and 70b are directed at the junction point of the belt 22 and the deck 42 and aimed slightly to the outside of center on their respective sides.

The nozzles 70a and 70b have a circular orifice of 0.025 inch diameter and operate with a back pressure of 40 psi behind each nozzle. Nozzles 70a and 70b will produce a stream of lubricant of sufficient velocity to spread the lubricant L when the lubricant L contacts the belt 22 and the deck 42. Under these conditions, the flow rate is approximately 0.10 gallons per minute for each nozzle or 0.20 gallons per minute total. This flow rate is identical to that of the spray nozzle discussed in conjunction with FIGS. 3–5, so the duration and interval of lubricant application would therefore remain the same.

A treadmill having an aerosol lubrication system is shown in FIG. 9. This embodiment employs an aerosol spray can 73 filled with aerosol lubricant AL to apply lubricant to the lower inside surface 58 of belt 22 in a manner similar to that shown in FIGS. 3–5. Both the can 73 and a spray activator such as a solenoid 74 are mounted to a bracket 76 which is, in turn, mounted to crossbar 44a. When lubrication is desired, solenoid 74 is activated, dispersing aerosol lubricant AL in the pattern shown as P' in FIG. 9. As in FIG. 3, the rotation of the belt 22 causes the aerosol to cover a strip-like track on the belt S. A spray shield 78 both defines the sides of strip S and prevents any overspray from reaching other treadmill components or surrounding areas outside the housing 30.

Preferably, the aerosol lubricant AL contains a paraffin wax as discussed in conjunction with the embodiment of FIGS. 3–5. Other aerosol lubricants useful in this embodiment include the MS-143 and MS-122/CO2 teflon lubricants available from Miller-Stephenson Chemical Co., Inc. of Morton Grove, Ill.

Figures 10, 11:
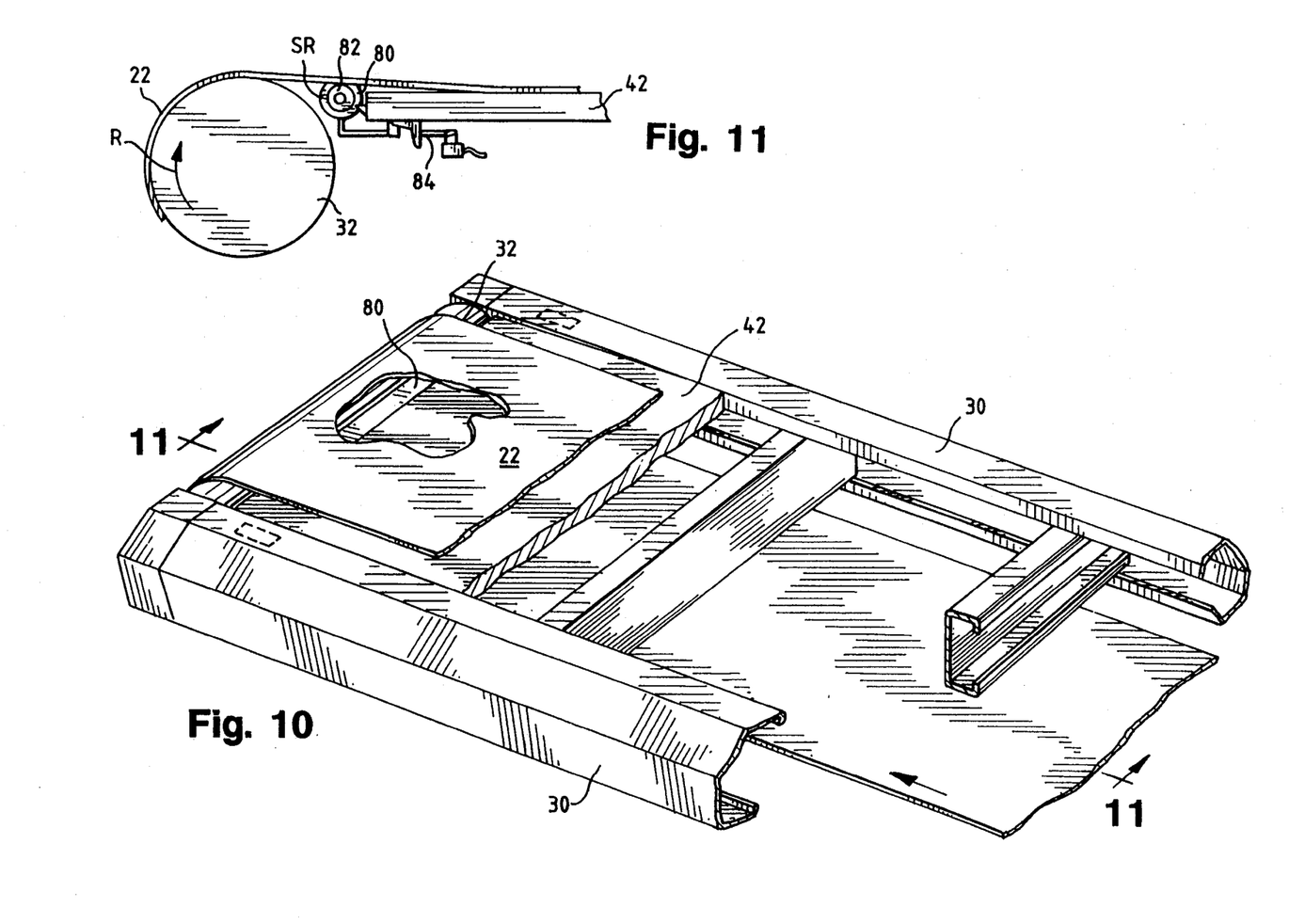
FIG. 10 is a partial perspective view of another embodiment of the lubricated treadmill invention using a solid wax lubrication system.
FIG. 11 is a partial cross-sectional view of the treadmill of FIG. 10 taken along line 11—11 of FIG. 10.

FIGS. 10 and 11 illustrate yet another embodiment of a lubricated treadmill. In this embodiment, a lubricant such as a solid paraffinic lubricant SR is applied to the belt 22 by a cylindrical wax bar 80 mounted just under the belt 22 and between the front pulley 32 and the support deck 42. The wax bar 80 is prevented from rotating by the cooperative action of ratchet 82 and a solenoid 84. When the lubrication control system determines that lubrication is needed, solenoid 84 is activated. This indexes ratchet 82 to the next ratchet position, thereby presenting a fresh wax bar surface to the belt 22. Other solid wax embodiments are possible. For example, it would be possible to use the previously described principals to dispense a granulated wax powder onto the belt or deck to reduce the belt to deck friction. This could be accomplished by energizing a shakeable granulated wax dispenser when lubrication is required. In some instances, this may be preferable, such as when either the belt or the deck is affected by moisture.

The lubrication systems described in conjunction with FIGS. 3-11 can operate under microprocessor control. The use of a microprocessor-based control system allows the lubricant to be dispensed either as a function of time, treadmill belt distance traveled, or a parameter representative of the coefficient of friction existing between the belt and the deck. The control system needed to operate the lubricating system of the treadmill can be of virtually any type known in the art. The control system need only provide an output for energizing the lubricant pump or solenoid, and need only accept the control input parameters described below for each control methodology.

Figure 12:
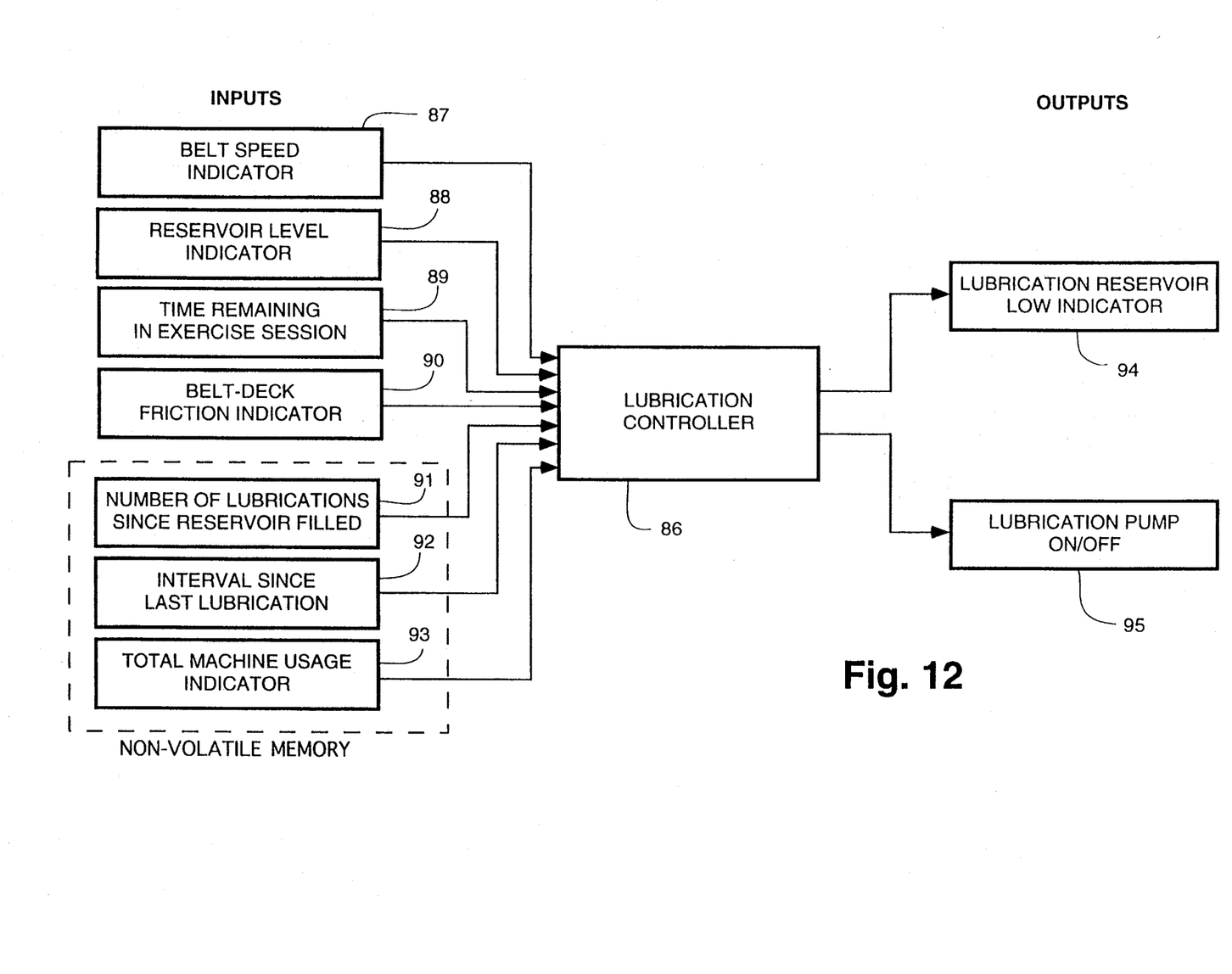
FIG. 12 is a simplified block diagram of the control signals useful for a lubrication control system.
Figure 13:
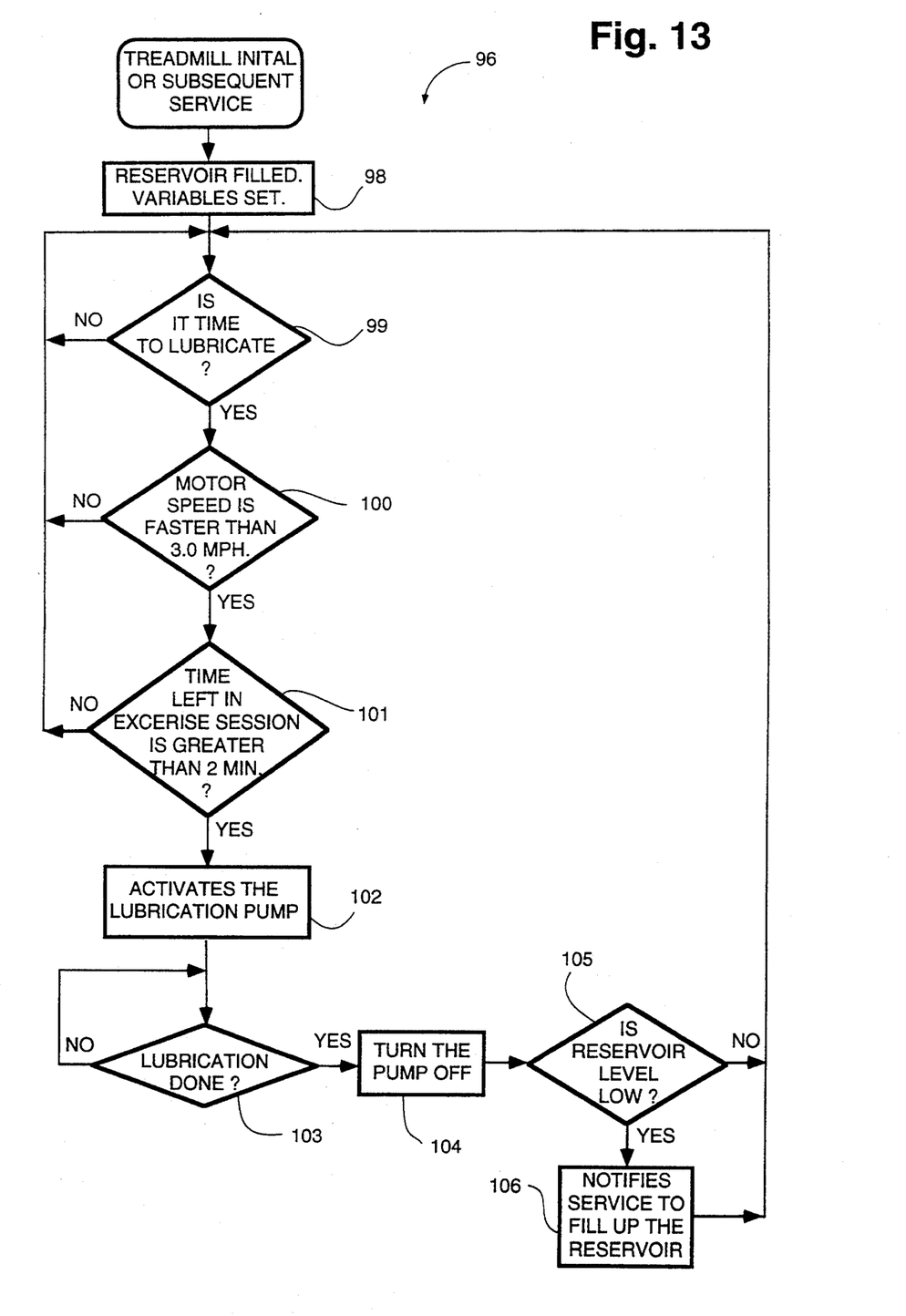
FIG. 13 is a flow chart of a control program useful for controlling the application of lubricant in accordance with invention.

FIGS. 12 and 13 describe the control inputs and software needed to apply treadmill lubricant as a function of treadmill operating time for either of the liquid lubricating systems already described in conjunction with FIGS. 3-8. Turning first to FIG. 12, a lubrication controller 86 accepts several inputs useful in implementing the control program described in conjunction with the flowchart of FIG. 13. While the lubrication controller 86 is shown as a separate controller, the controller 86 alternatively can be a microprocessor controller already in use in the machine which has been multi-tasked to provide control of the lubrication system.

Control inputs include signals from a belt speed indicator 87, a reservoir level indicator 88, a time remaining in exercise session value 89, a belt to deck friction indicator 90, a number of lubrications since reservoir fill value 91, an interval since last lubrication value 92 and a total machine usage indicator value 93. The values 91, 92 and 93 preferably are stored in non-volatile memory so they are not lost when power to the machine is lost. The controller outputs include a low lubricant level output 94 and a lubricant pump on/off output 95.

FIG. 13 is a flowchart of a lubrication control program 96 useful in the treadmill invention. The program 96 controls treadmill lubrication as a function of hours of treadmill motor operation. The program 96 is initialized when the treadmill 20 is first put into service at step 98. At step 98, the time between lubrications (the interval), and the duration of each lubrication are preset to the desired values, the reservoir 54 is filled, and the motor on-time is set to zero.

Software control of lubrication begins at step 99. As will be seen from the following discussion, the decision block 99 is a common return point for several branches of the control program 96. At decision block 99, the program determines if it is time to lubricate based on a comparison of the preset lubrication interval and the time accumulated since the last lubrication. Block 99 is repeated continuously until the accumulated motor on-time since the previous lubrication is greater than or equal to the preset lubrication interval. At that point, the program 96 proceeds to block 100, where it checks treadmill speed. Optimal distribution of lubricant occurs at speeds greater than 3 miles per hour. If the treadmill speed is less than 3 miles per hour, the program 96 returns to decision block 99.

If the treadmill speed is greater than or equal to 3 miles per hour, the program proceeds to decision block 101. At block 101, the program 96 tests to determine whether the remaining exercise time in the treadmill exercise routine is greater than two minutes. Optimal distribution of lubricant occurs when the lubricated belt continues to rotate for at least two minutes. If the time remaining in the exercise routine is less than two minutes, the program 96 returns to step 99.

If, at decision block 101, two or more minutes of exercise time remain, the program 96 proceeds to decision block 102 where it turns on the lubricant pump 48. After activating the pump 48, the program 96 proceeds to block 103 where the actual lubrication pump on-time is compared to the preset lubrication duration. When the pump on-time becomes greater than or equal to the preset duration, the lubrication is completed. After the lubrication is completed, the pump 48 is turned off in block 104.

Proceeding next to block 105, the program 96 checks for a low lubricant level in the reservoir 54. This may be determined by a level sensor, monitoring of the number of applications, or various other means. If lubricant level is determined to be low, the program 98 moves to block 106 where it notifies maintenance with an audio, visual, or electrical signal that the reservoir 54 requires refilling.

After notifying maintenance in block 106 or determining that the level is not sufficiently low for such a notification, the program 96 returns to decision block 99.

The program just described is easily modified to control treadmill lubrication as a function of treadmill belt distance traveled. In this case, program steps comparing motor on time to the time for the next lubrication would generally be replaced by steps comparing a desired treadmill distance travelled to the accumulated treadmill distance travelled. For example, the lubrication decision at step 99 would be made on the basis of accumulated treadmill distance travelled compared to a desired distance between lubrications entered at step 98. This modification is straightforward as treadmill distance travelled is easily computed as the product of treadmill motor on time and treadmill speed. The program 96 can also be adapted to a solid or aerosol lubrication system by triggering the lubrication actuator in block 102 and by turning it off or disengaging it in block 104.

Treadmill lubrication can also be performed when a parameter representative of belt to deck friction exceeds a given value. In this case, the program steps for applying the lubricant remain similar to those described in conjunction with FIG. 13. Unlike the program in FIG. 13, however, a sensor can be employed to measure when belt to deck friction exceeds a preset value. As it is difficult to measure belt to deck friction directly, a parameter representative of friction, such as treadmill drive motor current, can be used to approximate the belt to deck friction. Alternatively, a parameter such as the number of motor control pulses sent to the drive motor may be counted, as the number of pulses is generally proportional to the power required to drive the belt. A third method involves the sensing of the drag on the support deck 42 which is a function of belt to deck friction and user weight. In any of these cases, the measured parameter at a given speed is compared to the preset value for that speed. If the friction-related parameter exceeds the preset value, a lubrication cycle is initiated. Set points useful for friction-based programs should correspond to coefficients of friction in the range of 0.35 to 0.45.

Figure 14:
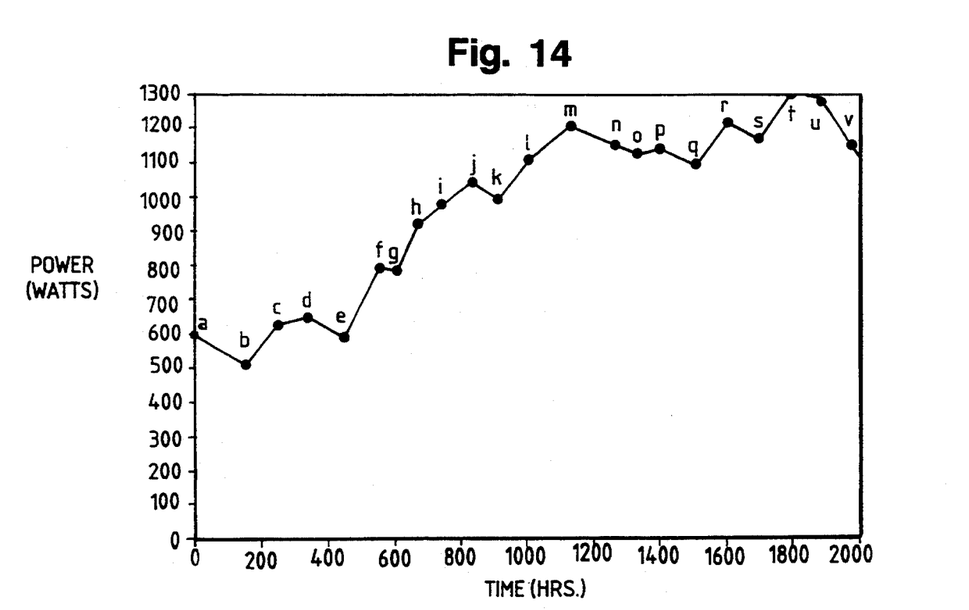
FIG. 14 is a graph showing motor current versus operating time for a non-lubricated treadmill.
Figure 15:
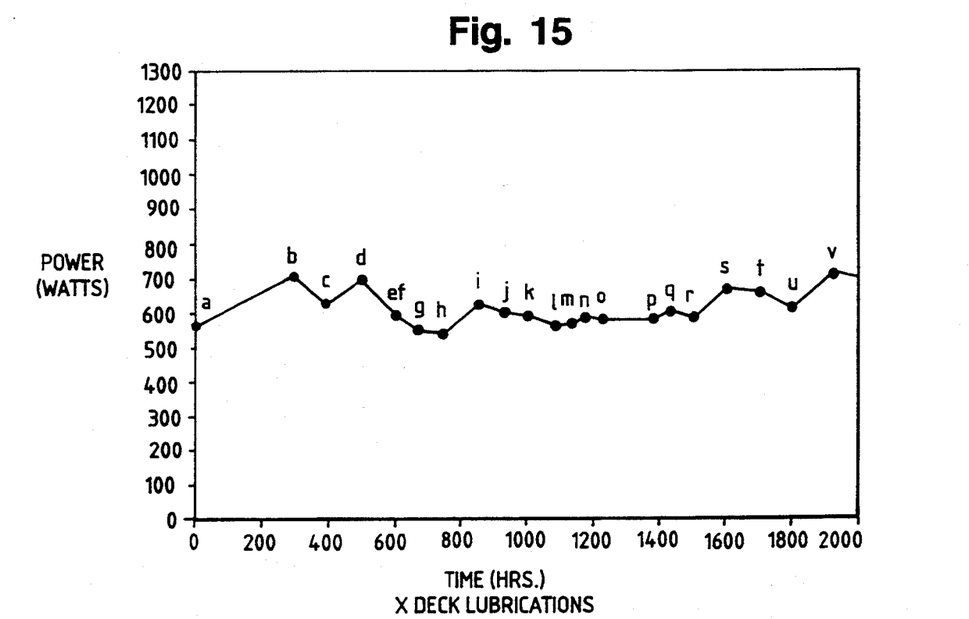
FIG. 15 is a graph showing motor current versus operating time for the lubricated treadmill invention.

The effects of periodic lubrication of a treadmill are best illustrated by comparing FIGS. 14 and 15. FIGS. 14 and 15 illustrate treadmill power consumption at 7 miles per hour as a function of operating time for treadmills similar to the one disclosed in U.S. Ser. No. 07/452,885, already incorporated by reference. In FIGS. 14 and 15, treadmill power consumption is measured at the points indicated by the lower case letters a-v. As can be seen in FIG. 14, at points a-e, the treadmill initially consumes about 600 to 700 watts of power over the first 500 hours of operation. As a result of the degradation of the factory applied lubrication, the power consumption steadily rises to over double the initial power consumption by about 1200 hours of operation, as indicated by points l-q.

FIG. 15 illustrates that power consumption of a treadmill can be kept at or near its original value by lubricating the treadmill in accordance with the embodiment of the invention described in FIGS. 3-5. As indicated by the letters "X" on the x axis, lubrication was applied five times over the first 2000 hours of treadmill operation. As a result, the power consumption of the treadmill remained at or below 700 watts over the entire measured range. FIG. 15 shows that the lubricated treadmill invention significantly reduces or eliminates the need for treadmill servicing to replace factory installed treadmill belt or deck lubricants.

We claim:

1. An exercise treadmill, comprising:
   a frame means having two generally longitudinal frame sections, wherein one ends of said two generally longitudinal frame sections connected to a front frame section and the other ends of said two generally longitudinal frame sections connected to an end frame section;
   pulley means mounted on the front and end frame sections of said frame means;
   endless belt means mounted on said frame means and said pulley means, said belt means having an upwardly exposed operative section for providing a continuously moving exercise surface on which an adult human user can run while exercising;
   deck means having front and rear ends extended along said frame means, said deck means located below and underlying said exercise surface for supporting said exercise surface from below when the adult human user's foot impacts said exercise surface, said deck means having sufficient strength to support the adult human user when the user runs on said exercise surface; and
   lubricating means for applying a lubricant to reduce friction between said impacted exercise surface and said deck means.

2. The treadmill of claim 1 further comprising control means for selectively applying said lubricant.

3. The treadmill of claim 2 wherein said control means selectively applies said lubricant according to a predetermined schedule.

4. The treadmill of claim 2 further comprising sensing means for measuring a parameter representative of the friction between said belt means and said deck means.

5. The treadmill of claim 4 wherein said control means selectively applies said lubricant in response to said parameter measured by said sensor means.

6. The treadmill of claim 5 wherein said control means includes calculating means for calculating when to apply said lubricant in response to said measured parameter.

7. An exercise treadmill, comprising:
   a frame means having two generally longitudinal frame sections, wherein one ends of said two generally longitudinal frame sections connected to a front frame section and the other ends of said two generally longitudinal frame sections connected to an end frame sections;
   pulley means mounted on the front and end frame sections of said frame means;
   endless belt means mounted on said frame means and said pulley means, said belt means having an upper belt run located above a lower belt run for providing a continuously moving exercise surface on which an adult human user can run while exercising;
   a deck having front and rear ends extended along said frame means, said deck located below and underlying said upper run for supporting said exercise surface from below when the adult human user's foot impacts said exercise surface of said upper run, said deck having sufficient strength to support the adult human user when the user runs on said exercise surface; and
   a lubrication system for applying a lubricant to reduce friction between said impacted exercise surface of said upper run and said deck, said lubrication system including a reservoir for storing said lubricant, a pump for withdrawing said lubricant from said reservoir and for applying said lubricant to said belt and control means for selectively applying said lubricant to said belt.

8. The treadmill of claim 7 wherein said lubrication system includes a nozzle for directing the application of said lubricant onto said belt.

9. The treadmill of claim 8 wherein said lubricant is a liquid.

10. The treadmill of claim 9 wherein said lubricant is applied to said lower belt run.

11. The treadmill of claim 9 wherein said liquid lubricant is a suspension.

12. The treadmill of claim 11 wherein said liquid lubricant is a paraffin wax suspended in aqueous solution.

13. The treadmill of claim 11 wherein said pump is a peristaltic pump.

14. The treadmill of claim 9 wherein said lubricant is in a sprayable form and wherein said pump and reservoir are an aerosol spray can.

15. The treadmill of claim 14 further comprising a spray shield for limiting the application of sprayed lubricant to said belt.

16. The treadmill of claim 15 wherein said lubricant is applied to said lower belt run.

17. An exercise treadmill, comprising:
   a frame means having two generally longitudinal frame sections, wherein one ends of said two generally longitudinal frame sections connected to a front frame section and the other ends of said two generally longitudinal frame sections connected to an end frame sections;

pulley means mounted on the front and end frame sections of said frame means;

endless belt means mounted on said frame means and said pulley means, said belt means having an upper belt run located above a lower belt run for providing a continuously moving exercise surface on which an adult human user can run while exercising;

a deck having front and rear ends extended along said frame means, said deck located below and underlying said upper run for supporting said exercise surface from below when the adult human user's foot impacts said exercise surface of said upper run, said deck having sufficient strength to support the adult human user when the user runs on said exercise surface; and a lubrication system for applying a lubricant to reduce friction between said impacted exercise surface of said upper run and said deck, said lubrication system including a reservoir for storing said lubricant, pump means for withdrawing said lubricant from said reservoir and for applying said lubricant to said deck and control means for selectively applying said lubricant to said deck.

18. The treadmill of claim 17 wherein said lubrication system includes a nozzle for directing the application of said lubricant to said deck.

19. The treadmill of claim 18 wherein said lubricant is a liquid.

20. The treadmill of claim 19 wherein said liquid lubricant is a suspension.

21. The treadmill of claim 20 wherein said liquid lubricant is a paraffin wax suspended in aqueous solution.

22. The treadmill of claim 20 wherein said pump is a peristaltic pump means.

23. The treadmill of claim 22 wherein said peristaltic pump is a dual pump and wherein said dual pump feeds a pair of nozzles, each nozzle directing lubricant to different portions of said deck.

24. The treadmill of claim 18 wherein said nozzle is located within an applicator bar mounted laterally with respect to said belt means, said applicator bar providing a smooth surface for contacting said belt means as said belt means rotates toward said applicator bar.

25. The treadmill of claim 24 wherein said applicator bar includes a surface downwardly inclined toward an oncoming exercise surface of said belt means.

26. An exercise treadmill, comprising:

endless belt means for providing a continuously moving exercise surface, said belt having an upper belt run located above a lower belt run;

a deck located below said upper run for supporting said surface from below when a treadmill user's foot impacts said upper run; and a lubrication bar for imparting wax to said belt as said belt rotates past said bar.

27. The treadmill of claim 26 wherein said lubrication bar is cylindrical in shape and is rotatably mounted adjacent said upper belt run.

28. The treadmill of claim 27 further comprising control means for controllably rotating said lubrication bar.

29. The treadmill of claim 28 wherein said bar includes ratchet means for incrementally controlling the rotation of said bar.

30. A method for lubricating an exercise treadmill, said exercise treadmill comprising a frame means having two generally longitudinal frame sections, wherein one ends of said two generally longitudinal frame sections connected to a front frame section and the other ends of said two generally longitudinal frame sections connected to an end frame sections; pulley means mounted on the front and end frame sections of said frame means; endless belt means mounted on said frame means and said pulley means, said belt means having upwardly exposed operative section for providing a continuously moving exercise surface on which an adult human user can run while exercising; a supporting deck having front and rear ends extended along said frame means, said deck located below and underlying said exercise surface for supporting said exercise surface from below when the adult human user's foot impacts said exercise surface of said upper run, said deck having sufficient strength to support the user when the user runs on said exercise surface; and lubricating means having a reservoir for storing a lubricant, pump means for withdrawing said lubricant from said reservoir and for applying said lubricant to said deck and control means for selectively applying said lubricant to said deck, said method comprising the steps of:

determining when to selectively lubricate the exercise treadmill by said control means; and applying a lubricant by said pump means for reducing friction between said belt means and said deck.

31. The method of claim 30 wherein said lubrication determining step includes the steps of presetting a point in time for lubrication, measuring elapsed treadmill operating time, and comparing the preset time to the elapsed time to determine when to apply said lubricant.

32. The method of claim 30 wherein said lubrication determining includes the steps of presetting a treadmill belt distance travelled, measuring the distance travelled, and comparing the measured distance to the preset distance to determine when to apply said lubricant.

33. The method of claim 30 wherein said lubrication determining step includes measuring a parameter indicative of belt to deck friction.

34. An exercise treadmill, comprising:

a frame means having two generally longitudinal frame sections, wherein one ends of said two generally longitudinal frame sections connected to a front frame section and the other ends of said two generally longitudinal frame sections connected to an end frame sections;

pulley means mounted on the front and end frame sections of said frame means;

endless belt means mounted on said frame means and said pulley means, said belt means having an upwardly exposed operative section for providing a continuously moving exercise surface on which an adult human user can run while exercising;

deck means having front and rear ends extended along said frame means, said deck located below and underlying said exercise surface for supporting said exercise surface from below when the adult human user's foot impacts said exercise surface, said deck means having sufficient strength to support the adult human user when the user runs on said exercise surface; and lubricating means for automatically and periodically applying a lubricant to said belt means to reduce friction between said impacted exercise surface and said deck means.

35. An exercise treadmill, comprising:

a frame means having two generally longitudinal frame sections, wherein one ends of said two generally longitudinal frame sections connected to a front frame section and the other ends of said two generally longitudinal frame sections connected to an end frame sections;

pulley means mounted on the front and end frame sections of said frame means;

endless belt means mounted on said frame means and said pulley means, said belt means having an upwardly exposed operative section for providing a continuously moving exercise surface on which an adult human user can run while exercising;

deck means having front and rear ends extended along said frame means, said deck located below and underlying said exercise surface for supporting said exercise surface from below when the adult human user's foot impacts said exercise surface, said deck means having sufficient strength to support the adult human user when the user runs on said exercise surface; and lubricating means for automatically and periodically applying a lubricant to said deck means to reduce friction between said impacted exercise surface and said deck means.

* * * * *